US012594741B2

(12) United States Patent
Akutsu et al.

(10) Patent No.: US 12,594,741 B2
(45) Date of Patent: Apr. 7, 2026

(54) DECORATIVE SHEET, AND METHOD FOR PRODUCING DECORATIVE SHEET

(71) Applicant: TOPPAN HOLDINGS INC., Tokyo (JP)

(72) Inventors: Erika Akutsu, Tokyo (JP); Yohei Nishikawa, Tokyo (JP); Kosuke Shimizu, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/674,236

(22) Filed: May 24, 2024

(65) Prior Publication Data

US 2024/0308174 A1 Sep. 19, 2024

Related U.S. Application Data

(63) Continuation of application No. PCT/JP2022/043797, filed on Nov. 28, 2022.

(30) Foreign Application Priority Data

Nov. 26, 2021 (JP) ................................. 2021-191998

(51) Int. Cl.
*B32B 3/30* (2006.01)
*B05D 3/06* (2006.01)
(Continued)

(52) U.S. Cl.
CPC ............... *B32B 3/30* (2013.01); *B05D 3/065* (2013.01); *B05D 3/068* (2013.01); *B05D 5/02* (2013.01);
(Continued)

(58) Field of Classification Search
CPC .... B05D 3/068; B05D 5/02; B05D 2502/005; C09D 4/00; C09D 5/28; B32B 27/308; B44C 5/0476
See application file for complete search history.

(56) References Cited

U.S. PATENT DOCUMENTS

2007/0231583 A1* 10/2007 Ilzuka ..................... B32B 27/10
428/411.1
2008/0070005 A1* 3/2008 Kobayashi .............. B32B 27/08
428/161
(Continued)

FOREIGN PATENT DOCUMENTS

JP 2017-171794 A 9/2017
JP 2019-119138 A 7/2019
(Continued)

OTHER PUBLICATIONS

International Searching Authority, "International Search Report," issued in connection with International Patent Application No. PCT/JP2023/043797, dated Feb. 14, 2023.
(Continued)

*Primary Examiner* — Frank J Vineis
(74) *Attorney, Agent, or Firm* — Foley & Lardner LLP

(57) ABSTRACT

A decorative sheet includes a primary film layer and a surface protection layer, the surface protection layer has a gloss level of 15 or less, the surface protection layer includes on a surface thereof a ridged portion protruding in a ridged pattern and thus has an irregular shape formed on the surface, the surface protection layer contains an ionizing radiation-curable resin as a main material, the ionizing radiation-curable resin contains as a main component a trifunctional acrylic resin having a repeating structure, the repeating structure is any of an ethylene oxide, propylene oxide, or & ε-caprolactone structure, the number of repetitions of the repeating structure is 3 or more, and vinyl groups
(Continued)

contained in the ionizing radiation-curable resin is 20% or less relative to carbonyl groups contained in the ionizing radiation-curable resin.

9 Claims, 3 Drawing Sheets

(51) Int. Cl.

| | |
|---|---|
| *B05D 5/02* | (2006.01) |
| *B32B 27/16* | (2006.01) |
| *B32B 27/30* | (2006.01) |
| *B44C 5/04* | (2006.01) |
| *C09D 4/00* | (2006.01) |
| *C09D 5/28* | (2006.01) |

(52) U.S. Cl.
CPC ............ *B32B 27/16* (2013.01); *B32B 27/308* (2013.01); *B44C 5/0476* (2013.01); *C09D 4/00* (2013.01); *C09D 5/28* (2013.01); *B05D 2502/005* (2013.01); *B32B 2250/02* (2013.01); *B32B 2264/303* (2020.08); *B32B 2307/406* (2013.01); *B32B 2307/408* (2013.01); *B32B 2307/538* (2013.01); *B32B 2307/7376* (2023.05); *B32B 2451/00* (2013.01)

(56) References Cited

U.S. PATENT DOCUMENTS

| | | | | |
|---|---|---|---|---|
| 2011/0143128 | A1* | 6/2011 | Saitou | B29C 45/14811 |
| | | | | 428/335 |
| 2011/0171429 | A1* | 7/2011 | Huang | B44C 1/172 |
| | | | | 428/161 |
| 2014/0255669 | A1* | 9/2014 | Akou | B32B 27/365 |
| | | | | 428/203 |
| 2015/0116425 | A1* | 4/2015 | De Meutter | B41J 2/2114 |
| | | | | 347/40 |
| 2018/0043669 | A1* | 2/2018 | Iriyama | B32B 27/20 |
| 2018/0043718 | A1* | 2/2018 | Masubuchi | C08G 18/42 |
| 2018/0257328 | A1* | 9/2018 | Shinbara | E04F 15/107 |
| 2019/0184688 | A1* | 6/2019 | Shinbara | C08J 7/046 |
| 2020/0061885 | A1* | 2/2020 | Fujii | B29C 45/14 |
| 2020/0299449 | A1* | 9/2020 | Siband | C08G 18/6258 |
| 2023/0025597 | A1* | 1/2023 | Akutsu | B44C 5/0476 |
| 2023/0323144 | A1* | 10/2023 | Kondo | B44F 1/02 |
| | | | | 428/141 |
| 2023/0364640 | A1* | 11/2023 | Nishine | B44F 1/02 |

FOREIGN PATENT DOCUMENTS

| | | | | | |
|---|---|---|---|---|---|
| JP | 2021-137806 | A | 9/2021 | | |
| JP | 2021-165033 | A | 10/2021 | | |
| KR | 2020-0031282 | A | 3/2020 | | |
| KR | 2020-0059905 | A | 5/2020 | | |
| WO | WO-2022054645 | A1 * | 3/2022 | | B05D 5/02 |
| WO | WO-2022145137 | A1 * | 7/2022 | | C09D 133/08 |

OTHER PUBLICATIONS

International Searching Authority, "Written Opinion," issued in connection with International Patent Application No. PCT/JP2023/043797, dated Feb. 14, 2023.

European Extended Search Report issued in corresponding European Patent Application No. 22898696.4 dated Feb. 18, 2025.

* cited by examiner

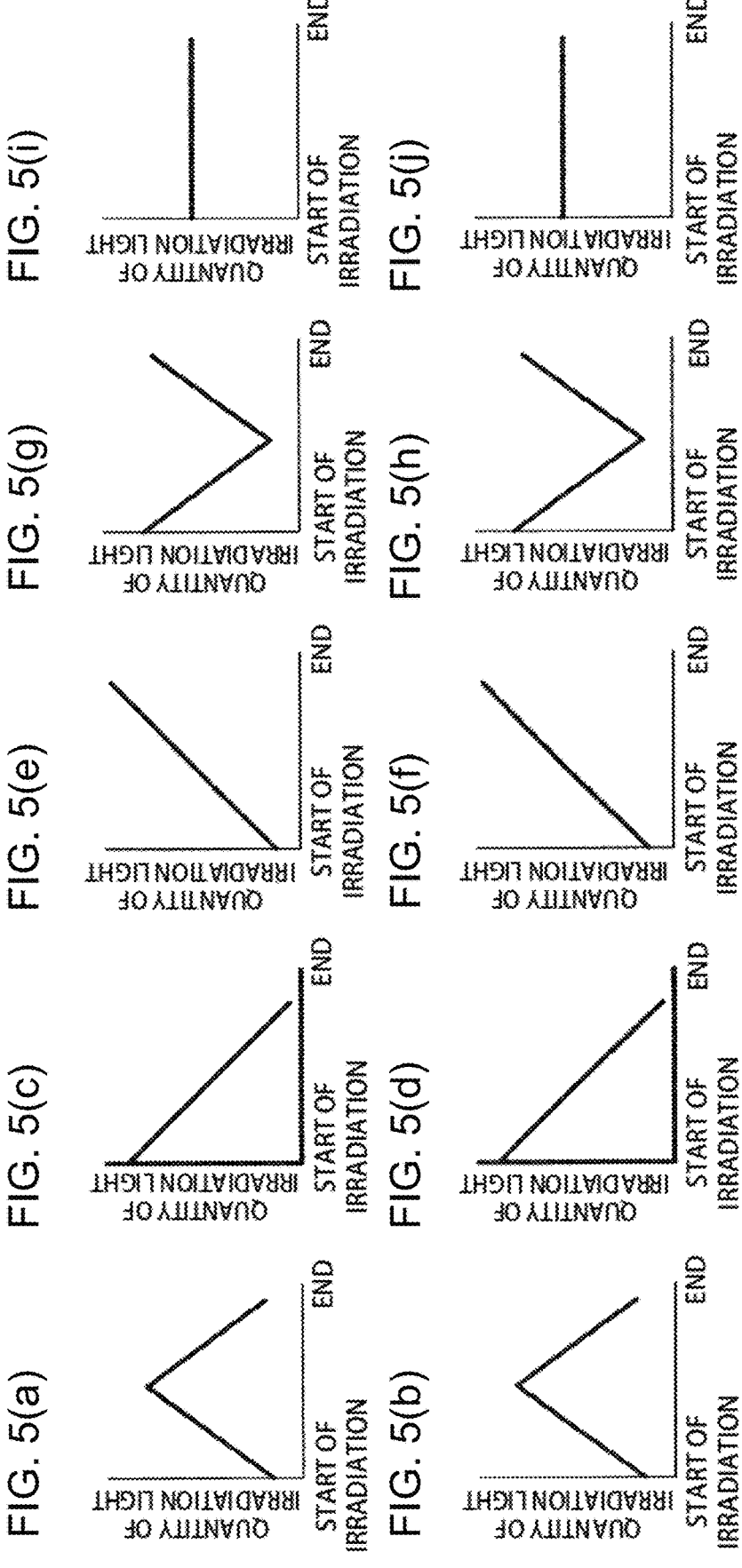

DECORATIVE SHEET, AND METHOD FOR PRODUCING DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/043797, filed on Nov. 28, 2022, which is based upon and claims the benefit to Japanese Patent Application No. 2021-191998, filed on Nov. 26, 2021, the disclosures of all which are incorporated herein by reference in their entirety.

TECHNICAL FIELD

The present invention relates to a decorative sheet used for, for example, decorating surfaces of the interior and exterior of buildings, fittings, furniture, construction materials, floor materials, and the like, and to a method for producing the decorative sheet.

BACKGROUND

Background Art

In order to impart design quality and durability to the surface of buildings, decorative sheets are typically widely used by being bonded to the surfaces of wood, wooden boards, metal plates, fireproof boards, paper substrates, resin substrates, or the like with an adhesive or the like interposed therebetween, and thus formed into decorative boards.

To provide design quality, designs are selected depending on requirements and applications, ranging from wood-grain or stone-grain patterns formed by various printing methods to a plain surface without a pattern. Similarly, the gloss of a surface is also an important aspect of design quality, and glosses ranging from a high, mirror-like gloss to low gloss causing no reflection are selected depending on requirements and applications.

As described above, along with design quality, durability is an important feature of decorative sheets. Durability is determined by an overall evaluation of scratch resistance, stain resistance, and whether they are maintained over a long period of time. Although requirements vary depending on the environment and conditions in which decorative sheets are used, highly durable decorative sheets are always in demand.

Durability is typically imparted by forming a surface protection layer on the outermost surface of the decorative sheet. In order to adjust the above-mentioned gloss, in particular, to achieve low gloss, a matting agent (matting additive) is typically added to the surface protection layer.

Further, the decorative sheet is typically subjected to processes such as cutting and bending to form a decorative board or a decorative material and therefore preferred to be processable enough to tolerate these processes.

As such a decorative sheet obtained in consideration of the design quality (low gloss), scratch resistance, and stain resistance, there is, for example, a decorative sheet described in Patent Literature 1.

[Citation List] [Patent Literature] PTL 1: JP 2019-119138 A.

SUMMARY OF THE INVENTION

Technical Problems

Due to expansion of the use of decorative boards including decorative sheets and consumers becoming more quality-conscious, decorative sheets are recently required to have a gloss level of 15 or less and achieve all of fingerprint resistance, scratch resistance, stain resistance, and bending workability.

Regarding the requirement described above, gloss adjustment is achieved by adding a matting agent to roughen the surface. Adding a large amount of a matting agent, however, causes the following inconveniences. (1) Fingerprint stains are not easily removed and fingerprint resistance is thus decreased. (2) The matting agent is detached in a scratch resistance test and the scratch resistance is thus decreased. (3) Stains are not easily removed and stain resistance is thus decreased. (4) The matting agent triggers whitening when a bending process is performed, and the bending workability is thus decreased.

In order to solve the above problems, an object of the present invention is to provide a decorative sheet and a method for producing the decorative sheet, the decorative sheet having high design quality with low-gloss, and also having fingerprint resistance, high durability (in particular, scratch resistance and stain resistance), and workability.

Solution to Problems

By repeated experimentation to optimize an irregular shape of a surface protection layer and to find necessary structural elements of materials used for the surface protection layer, the inventors of the present invention have found that a decorative sheet having a gloss level of 15 or less, and exhibiting fingerprint resistance, high durability (in particular, scratch resistance and stain resistance), and workability can be provided.

In order to solve the problems, a decorative sheet according to one aspect of the present invention includes, to summarize, a primary film layer and a surface protection layer disposed on one surface of the primary film layer, wherein the surface protection layer has a gloss level of 15 or less, the surface protection layer includes on a surface thereof a ridged portion protruding in a ridged pattern and thus has an irregular shape formed on the surface, the surface protection layer contains an ionizing radiation-curable resin as a main material, the ionizing radiation-curable resin contains as a main component a trifunctional acrylic resin having a repeating structure, the repeating structure is any of an ethylene oxide, propylene oxide, or ε-caprolactone structure, the number of repetitions of the repeating structure is 3 or more, and vinyl groups contained in the ionizing radiation-curable resin are 20% or less relative to carbonyl groups contained in the ionizing radiation-curable resin.

Advantageous Effects of the Invention

One aspect of the present invention can provide a decorative sheet having a gloss level of 15 or less, and achieving all of fingerprint resistance, scratch resistance, stain resistance, and workability.

BRIEF DESCRIPTION OF THE DRAWINGS

FIGS. 5(a)-5(j) show schematic graphs illustrating the change of the quantity of irradiation light with time during a process for producing the decorative sheet according to an embodiment of the present invention.

DETAILED DESCRIPTION

Description of the Embodiment

Hereinafter, the configuration of a decorative sheet according to an embodiment of the present invention is described with reference to the drawings.

Here, the drawings are schematic, and the relationship between the thickness and the plan dimensions, the ratio in thickness between layers, and the like may be different from actual ones. In addition, the embodiment described below is an example of the configuration for embodying the technical idea of the present invention, and the technical idea of the present invention can undergo various modifications within the technical scope defined by the claims stated in the claims.

(Configuration)

Figure 1:
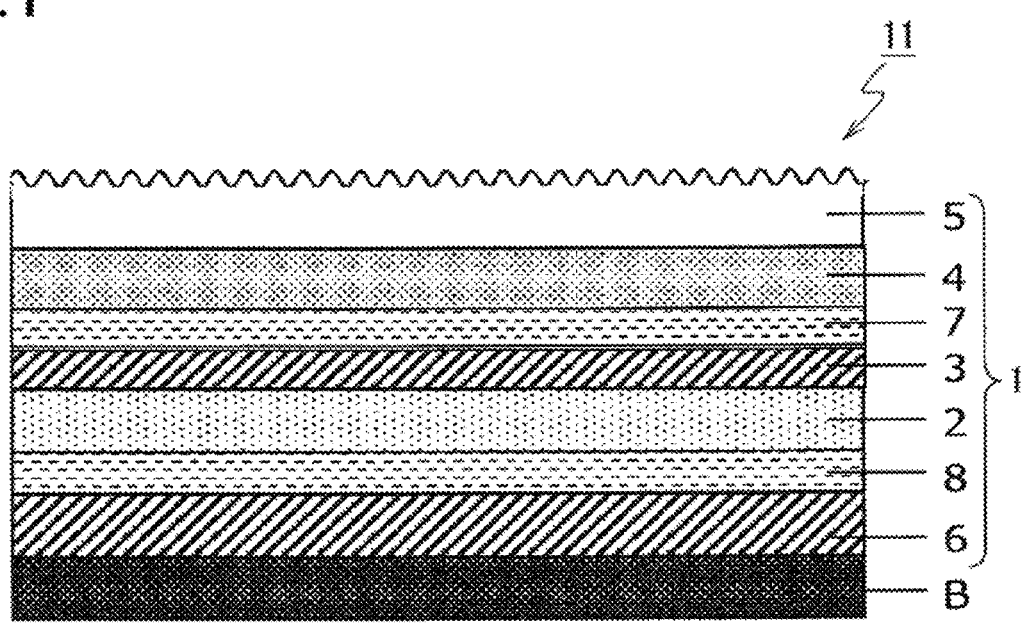
FIG. 1 is a schematic cross-sectional view illustrating a configuration of a decorative sheet according to an embodiment of the present invention.

As illustrated in FIG. 1, a decorative sheet 1 according to the present embodiment is configured to include, on the front-surface side that is one surface of a primary film layer (base layer) 2, a pattern layer 3, an adhesive layer 7 (a heat-sensitive adhesive layer, an anchor coat layer, or a dry lamination adhesive layer), a transparent resin layer 4, and a surface protection layer 5 laminated in this order. The decorative sheet 1 also includes, on the rear-surface side that is the other surface of the primary film layer 2, a concealing layer 8 and a primer layer 6. The pattern layer 3 and the adhesive layer 7, the transparent resin layer 4, the concealing layer 8, and the primer layer 6 may be omitted.

As illustrated in FIG. 1, the decorative sheet 1 according to the present embodiment is bonded to a substrate B and thereby formed into a decorative material 11. The substrate B is not particularly limited, and may be formed of, for example, a wooden board, an inorganic board, a metal plate, or a composite plate made from a plurality of materials.

Primary Film Layer 2

As the primary film layer 2, any selected from, for example, paper, a synthetic resin or a foam of a synthetic resin, rubber, nonwoven fabric, synthetic paper, or a metal foil may be used. Examples of the paper include tissue paper, titanium paper, and resin-impregnated paper. Examples of the synthetic resin include polyethylene, polypropylene, polybutylene, polystyrene, polycarbonate, polyester, a polyamide, an ethylene-vinyl acetate copolymer, polyvinyl alcohol, and acrylic. Examples of the rubber include ethylene-propylene copolymer rubber, ethylene-propylene-diene copolymer rubber, styrene-butadiene copolymer rubber, styrene-isoprene-styrene block copolymer rubber, a styrene-butadiene-styrene block copolymer rubber, and polyurethane. As the nonwoven fabric, organic or inorganic nonwoven fabric can be used. Examples of a metal of the metal foil include aluminum, iron, gold, and silver.

When an olefin-based resin is used as the primary film layer 2, the primer layer 6 is preferably disposed between the primary film layer 2 and the substrate B because the surface of the primary film layer 2 is often inert. Besides, in order to improve adhesion between the primary film layer 2 made from an olefin-based material and the substrate B, the primary film layer 2 may be subjected to a surface modification treatment such as a corona treatment, a plasma treatment, an ozone treatment, an electron beam treatment, an ultraviolet light treatment, and a dichromic acid treatment.

As the primer layer 6, the same material as the material of the pattern layer 3 described later can be used. The primer layer 6 is provided on the rear surface of the decorative sheet 1, and therefore in consideration of the decorative sheet 1 being wound in a web shape, an inorganic filler may be added to the primer layer 6 to avoid blocking and increase cohesion to an adhesive. Examples of the inorganic filler include silica, alumina, magnesia, titanium oxide, and barium sulfate.

In consideration of printing workability and costs, the primary film layer 2 preferably has a layer thickness in a range of 20 μm or more and 250 μm or less.

Pattern Layer 3

The pattern layer 3 is a layer obtained by printing a pattern on the primary film layer 2 using ink. An ink binder can appropriately be selected for use from a single one of, for example, nitrocellulose, cellulose, a vinyl chloride-vinyl acetate copolymer, polyvinyl butyral, polyurethane, acrylic, or polyester, or modified products thereof. The binder may be any of an aqueous, solvent-based, or emulsion type, and may be a one-part type or a two-part type including a curing agent. Further, a method may be used in which curable ink is used and the ink is cured by irradiation with ultraviolet light, electron beams, or the like. Among these methods, the most typical method is a method of using urethane-based ink cured using an isocyanate. In addition to the binder, the pattern layer 3 has added thereto, for example, a coloring agent such as a pigment and a dye, an extender pigment, a solvent, and various additives contained in general ink. Examples of highly versatile pigments include condensed azo pigments, insoluble azo pigments, quinacridones, isoindolines, anthraquinones, imidazolones, cobalt, phthalocyanines, carbon, titanium oxide, iron oxide, and pearl pigments such as mica.

Besides the application of ink, it is also possible to apply a design to the pattern layer 3 by vapor deposition or sputtering of various metals. In particular, the ink preferably has a photostabilizer added thereto. This addition can suppress degradation of the decorative sheet 1 itself caused by photodegradation of ink and prolong the life of the decorative sheet 1.

Adhesive Layer 7

The adhesive layer 7 is a layer also called a heat-sensitive adhesive layer, an anchor coat layer, or a dry lamination adhesive layer.

The resin material for the adhesive layer 7 is not particularly limited, and can be appropriately selected for use from, for example, an acrylic, polyester-based, polyurethane-based, or epoxy-based resin material. Alternatively, as the resin material for the adhesive layer 7, for example, an ethylene-vinyl acetate copolymer resin-based adhesive can also be used. The coating method can be appropriately selected according to, for example, the viscosity of the adhesive. Gravure coating, however, is typically used, and after being applied to the top of the pattern layer 3 by gravure coating, the adhesive is laminated together with the transparent resin layer 4. The adhesive layer 7 can be omitted when the adhesion strength between the transparent resin layer 4 and the pattern layer 3 is sufficiently obtained.

Transparent Resin Layer 4

As the resin material for the transparent resin layer 4, an olefin-based resin is suitably used. Examples of the olefin-based resin include, besides polypropylene, polyethylene, polybutene, and the like, homopolymers of a-olefins or copolymers of two or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene), and copolymers of ethylene or an α-olefin with another monomer, such as an ethylene-vinyl acetate copolymer, an ethylene-vinyl alcohol copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, and an ethylene-butyl acrylate copolymer.

In order to improve surface strength of the decorative sheet 1, highly crystalline polypropylene is preferably used as the resin of the transparent resin layer 4. To the transparent resin layer 4, various additives can be added as necessary, such as a thermal stabilizer, a photostabilizer, an anti-blocking agent, a catalyst scavenger, a coloring agent, a light scattering agent, and a matting agent. The thermal stabilizer is typically added in any combination between, for example, phenol-based, sulfur-based, phosphorus-based, hydrazine-based thermal stabilizers, and the photostabilizer is typically added in any combination between hindered amine-based photostabilizers.

Surface Protection Layer 5

The surface protection layer 5 includes a core portion 5A and a ridged portion 5B protruding in a ridged pattern from one surface of the core portion 5A. The surface protection layer 5 thus has an irregular shape formed on the surface thereof.

In the decorative sheet 1 according to the present embodiment, the "ridged pattern" refers to a pattern of narrow and long protrusions that linearly continue in plan view. The ridged portion 5B may be curved or linear in plan view, but is preferably curved from the viewpoint of fingerprint resistance on the surface of the decorative sheet 1. In the present disclosure, the ridged portion 5B may be, for example, a part from the lowest portion to the tip of the irregular shape disposed on the surface of the surface protection layer 5, and the core portion 5A refers to a part excluding the ridged portion 5B of the surface protection layer 5.

Figure 2:
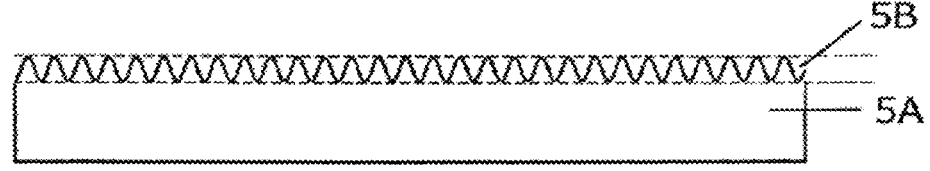
FIG. 2 is a schematic cross-sectional view illustrating one configuration of a surface protection layer in the decorative sheet according to an embodiment of the present invention.
Figure 3:
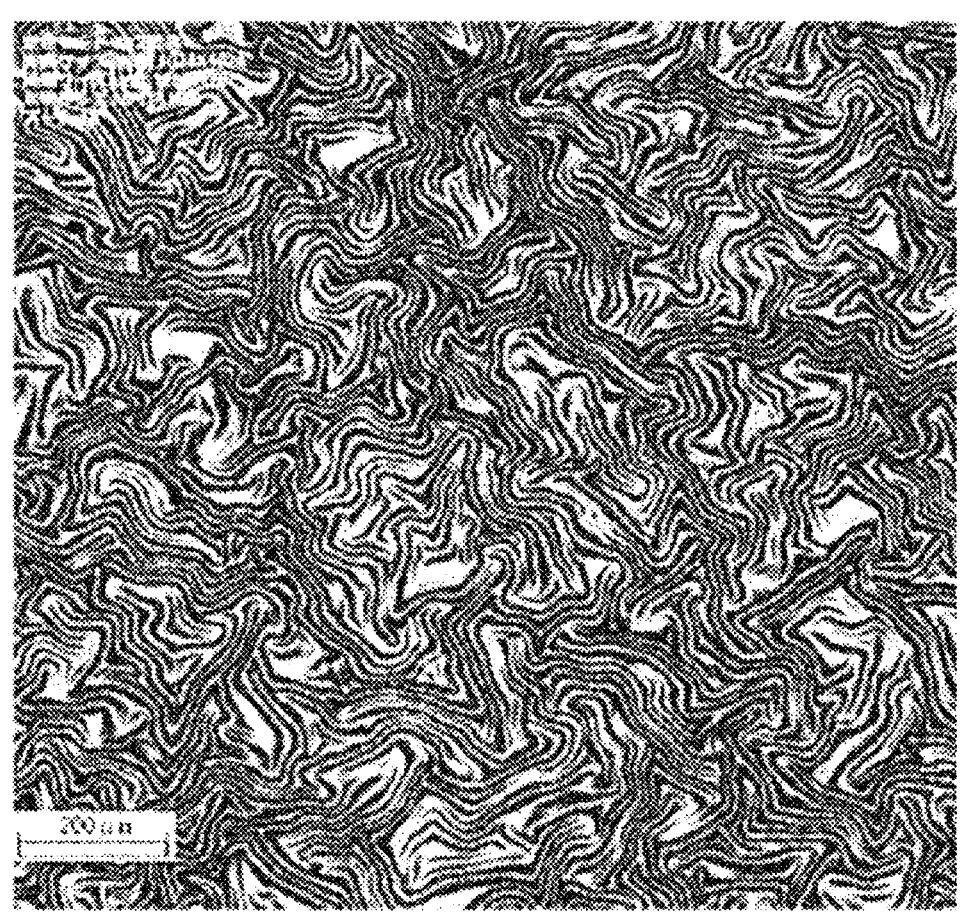
FIG. 3 is a plan view image illustrating one configuration example of the surface of the surface protection layer in the decorative sheet according to an embodiment of the present invention.

FIG. 2 is a cross-sectional view schematically illustrating a cross-section (a cross-section in the thickness direction of the surface protection layer 5) of the ridged portion 5B in the surface protection layer 5, and FIG. 3 is a plan view image illustrating a configuration of the surface of the surface protection layer 5. Here, FIG. 3 is a plan view image obtained with a laser microscope (OLS-4000 manufactured by Olympus Corporation).

As illustrated in the plan view image of FIG. 3, the ridged portion 5B is in the shape of narrow and long protrusions that linearly continue in plan view. As described later, the ridged portion 5B is formed by irradiating the surface of an ionizing radiation-curable resin with light having a certain wavelength and thus shrinking the surface of the ionizing radiation-curable resin.

Such a shape of the ridged portion 5B can be represented by a ratio RSm/Ra between a transverse (the planar direction of the surface protection layer 5, which is the horizontal direction in FIG. 2) surface roughness index RSm (μm) and a height (the depth direction of the ridged portion 5B, i.e., the thickness direction of the surface protection layer 5, which is the vertical direction in FIG. 2) surface roughness index Ra (μm), and RSm/Ra is preferably 10 or more and 300 or less. RSm/Ra is more preferably 50 or more and 300 or less. When RSm/Ra is less than 10, the shape of the ridged portion 5B is excessively fine and therefore stains are not easily wiped off and the stain resistance is deteriorated. When RSm/Ra is more than 300, the gap between ridge shapes is excessively wide and therefore the surface protection layer 5 does not have low gloss.

RSm/Ra is further preferably 100 or more and 300 or less. When RSm/Ra is in this numerical range, the gap between ridge shapes has an appropriate width and therefore the surface protection layer 5 has improved affinity to water or a detergent (water containing a surfactant or an alcohol). Therefore, the decorative sheet having RSm/Ra in this numerical range can have stains easily wiped off therefrom using water or a detergent even if the surface of the decorative sheet is stained.

RSm/Ra is most preferably 100 or more and 250 or less. When RSm/Ra is in this numerical range, a typically commercially available washing sponge easily penetrates between ridge shapes, and even if the surface of the decorative sheet is stained, the stain is easily wiped off using the typically commercially available washing sponge.

Here, Ra and RSm are measurement values obtained through measurement using a line roughness meter (in conformity with JIS B 0601).

The cross-sectional shape of the ridged portion 5B in the thickness direction of the surface protection layer 5 may be a sinusoidal shape.

Figure 4:
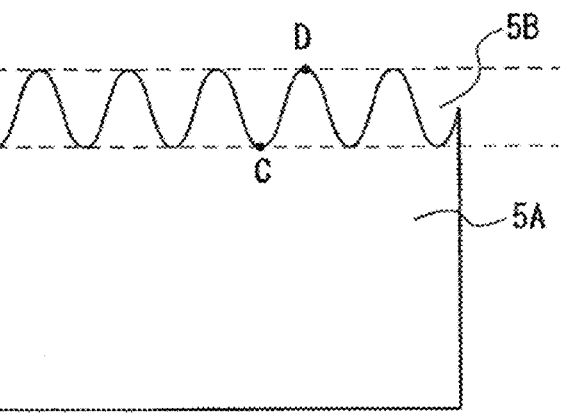
FIG. 4 is a schematic cross-sectional view illustrating a cross-sectional shape of a ridged portion in an embodiment of the present invention.

Here, as illustrated in FIG. 4, the "sinusoidal shape" refers to a shape in which the line from a lowest position C to a highest position (apex) D of the ridged portion 5B can be expressed by a sinusoidal wave.

Hereinafter, a mechanism of forming the ridged portion 5B is described.

When irradiated with first irradiation light, i.e., light having a wavelength of 200 nm or less, an acrylate can be self-excited. Accordingly, irradiation of an acrylate with light at 200 nm or less enables the acrylate to be crosslinked. Light at 200 nm or less reaches a depth of around several tens to hundreds nm in the acrylate. Therefore, crosslinking occurs only on the surface while the underlying part has fluidity, thus producing a fine wavy irregular shape like a folding crease.

The surface protection layer 5 thus formed has no interface between the core portion 5A and the ridged portion 5B, and the core portion 5A and the ridged portion 5B are integrally and continuously formed.

Light at 200 nm or less is absorbed by oxygen in the air and greatly attenuated. Therefore, in the treatment of the acrylate, nitrogen gas needs to be introduced to control the reaction atmosphere. The concentration of residual oxygen in the reaction atmosphere is preferably suppressed to 2,000 ppm or less. The concentration of residual oxygen in the reaction atmosphere is more preferably 1,000 ppm or less.

In order to generate the irregular shape using the first irradiation light, i.e., the light having a wavelength of 200 nm or less, the integrated light intensity of the first irradiation light is preferably set to 0.5 mJ/cm$^2$ or more and 200 mJ/cm$^2$ or less. The integrated light intensity is more preferably 1 mJ/cm$^2$ or more and 100 mJ/cm$^2$ or less. The integrated light intensity is further preferably 3 mJ/cm$^2$ or more and 50 mJ/cm$^2$ or less. The integrated light intensity is most preferably 5 mJ/cm$^2$ or more and 30 mJ/cm$^2$ or less. When the integrated light intensity is less than 0.5 mJ/cm$^2$, the cure shrinkage reaction proceeds slowly and the irregular shape is not sufficiently formed, and therefore the gloss is not decreased. When the integrated light intensity is more than 200 mJ/cm$^2$, the cure shrinkage reaction proceeds excessively rapidly and the surface state is deteriorated.

The light at 200 nm or less can be extracted from excimer VUV light. The excimer VUV light can be produced from a lamp filled with a noble gas or a noble gas halide compound. When a lamp having a noble gas or a noble gas halide compound gas sealed therein is externally provided with high energy electrons, the lamp generates a large amount of discharge plasma (dielectric barrier discharge). This plasma discharge excites atoms of the discharge gas (noble gas) and instantaneously converts them into an excimer state. When the atoms return from the excimer state to the ground state, light having a wavelength in a range specific to that excimer is emitted.

As the gas used for the excimer lamp, any conventionally used gas may be used as long as the gas causes emission of light at 200 nm or less. As the gas, a noble gas such as Xe, Ar, and Kr, or a mixed gas of a noble gas with a halogen gas, such as ArBr and ArF, can be used. The excimer lamp emits light of different wavelengths (center wavelengths) depending on the gas, such as about 172 nm (Xe), about 126 nm (Ar), about 146 nm (Kr), about 165 nm (ArBr), and about 193 nm (ArF).

However, in consideration of the magnitude of the obtained photon energy and a difference between the wavelength and the bond energy of the organic matter, a xenon lamp emitting excimer light having a center wavelength of 172 nm is preferably used as a light source. Also in consideration of facility maintenance costs, material availability, and the like, a xenon lamp is preferably used as a light source.

The first irradiation light, i.e., the light having a wavelength of 200 nm or less, only reaches a depth of around several tens to hundreds nm from the outermost surface in the acrylate, and therefore the inside of the surface protection layer 5 including the ridged portion 5B formed by the irradiation with the light at 200 nm or less is flowable and a curing reaction must be further promoted. In order to cure the surface protection layer 5 after the irradiation with the light at 200 nm or less, ionizing radiation or UV light having a wavelength greater than the first irradiation light of 200 nm or less can be used as second irradiation light.

In the present embodiment, after the irradiation with the second irradiation light, for example, irradiation may be performed using, as third irradiation light, ionizing radiation different from the second irradiation light or UV light having a wavelength greater than the wavelength of the second irradiation light. The surface protection layer 5 including the ridged portion 5B, however, is preferably formed only by irradiation with the two types of light, i.e., the first irradiation light and the second irradiation light. The third irradiation light may be applied when the strength of the surface protection layer 5 is not sufficient only with the irradiation with the second irradiation light.

In order to cure the entire surface protection layer 5 with the irradiation with the second irradiation light, the integrated light intensity of the second irradiation light is preferably set to 10 mJ/cm$^2$ or more and 500 mJ/cm$^2$ or less. The integrated light intensity is more preferably 50 mJ/cm$^2$ or more and 400 mJ/cm$^2$ or less. The integrated light intensity is further preferably 100 mJ/cm$^2$ or more and 300 mJ/cm$^2$ or less. When the integrated light intensity is less than 10 mJ/cm$^2$, the curing reaction is weak and strength cannot be sufficiently imparted to the entire surface protection layer 5, and therefore the scratch resistance tends to be decreased. When the integrated light intensity is more than 200 mJ/cm$^2$, the curing reaction is excessively strong and the surface state tends to be deteriorated.

The integrated light intensity of the second irradiation light is preferably larger than the integrated light intensity of the first irradiation light. The integrated light intensity of the second irradiation light is preferably 1.1 times or more and 50.0 times or less, more preferably 5.0 times or more and 30.0 times or less the integrated light intensity of the first irradiation light. When the integrated light intensity of the second irradiation light is less than 1.1 times the integrated light intensity of the first irradiation light, the curing reaction is weak and sometimes sufficient strength cannot be imparted to the entire surface protection layer 5. When the integrated light intensity of the second irradiation light is more than 50.0 times the integrated light intensity of the first irradiation light, the curing reaction in the entire surface protection layer 5 is excessively strong and the shape of the ridged portion 5B may be deformed.

Hereinafter, the change of the quantity of the first irradiation light with time and the change of the quantity of the second irradiation light with time are described with reference to FIGS. 5(a)-5(j).

FIGS. 5(a)-5(j) show graphs schematically illustrating the change of the quantity of the first irradiation light with time and the change of the quantity of the second irradiation light with time.

FIG. 5(a), (c), (e), (g), and (i) are graphs schematically illustrating the change of the quantity of the first irradiation light with time. FIG. 5(b), (d), (f), (h), and (j) are graphs schematically illustrating the change of the quantity of the second irradiation light with time.

As illustrated in FIG. 5(a), the quantity of the first irradiation light may be gradually increased with the lapse of irradiation time and thereafter gradually decreased with the lapse of irradiation time. As illustrated in FIG. 5(c), the quantity of the first irradiation light may be gradually decreased with the lapse of irradiation time. As illustrated in FIG. 5(e), the quantity of the first irradiation light may be gradually increased with the lapse of irradiation time. As illustrated in FIG. 5(g), the quantity of the first irradiation light may be gradually decreased with the lapse of irradiation time and thereafter gradually increased with the lapse of irradiation time. As illustrated in FIG. 5(i), the quantity of the first irradiation light may be constant from the start to the end of the irradiation.

As illustrated in FIG. 5(b), the quantity of the second irradiation light may be gradually increased with the lapse of irradiation time and thereafter gradually decreased with the lapse of irradiation time. As illustrated in FIG. 5(d), the quantity of the second irradiation light may be gradually decreased with the lapse of irradiation time. As illustrated in FIG. 5(f), the quantity of the second irradiation light may be gradually increased with the lapse of irradiation time. As illustrated in FIG. 5(h), the quantity of the second irradiation light may be gradually decreased with the lapse of irradiation time and thereafter gradually increased with the lapse of irradiation time. As illustrated in FIG. 5(j), the quantity of the second irradiation light may be constant from the start to the end of the irradiation.

In the present embodiment, the irradiation forms of the first irradiation light illustrated in FIG. 5(a), (c), (e), (g), and (i) and the irradiation forms of the second irradiation light illustrated in FIG. 5(b), (d), (f), (h), and (j) can be used in appropriate combinations. For example, the irradiation form of the first irradiation light illustrated in FIG. 5(a) and the irradiation form of the second irradiation light illustrated in FIG. 5(f) may be used in combination. Alternatively, the irradiation form of the first irradiation light illustrated in FIG. 5(g) and the irradiation form of the second irradiation light illustrated in FIG. 5(f) may be used in combination. When the value of RSm/Ra is set to the more preferable range, i.c., 10 or more and 300 or less, the irradiation form of the first irradiation light illustrated in FIG. 5(c) and the irradiation form of the second irradiation light illustrated in FIG. 5(f) may be used in combination.

As described above, the ridged portion 5B formed by irradiation with light at 200 nm or less has a finer structure than the structure of an irregular shape formed on the surface of the surface protection layer 5 by a machine process such as embossing. The formation of such a fine irregular shape on the surface of the surface protection layer 5 enables the decorative sheet 1 to have improved fingerprint resistance while maintaining matting of the surface thereof.

The surface protection layer 5 preferably has a layer thickness in a range of 2 μm or more and 20 μm or less. The surface protection layer 5 more preferably has a layer thickness in a range of 3 μm or more and 20 μm or less. The surface protection layer 5 further preferably has a layer thickness in a range of 5 μm or more and 15 μm or less. The surface protection layer 5 most preferably has a layer thickness in a range of 5 μm or more and 12 μm or less. A surface protection layer 5 having a layer thickness of less than 2 μm does not allow deep shaping by vacuum ultra-violet light and cannot achieve low gloss. A surface protection layer 5 having a layer thickness of more than 20 μm decreases workability and becomes whitened when bent.

The layer thickness of the surface protection layer 5 is set such that the ratio between the layer thickness of the ridged portion 5B and the layer thickness of the core portion 5A (layer thickness of ridged portion 5B/layer thickness of core portion 5A) is preferably 0.01 or more and 2.0 or less, more preferably 0.1 or more and 1.0 or less.

Here, the pattern layer 3 and the surface protection layer 5 can be formed by various printing methods such as a gravure printing method, an offset printing method, a screen printing method, an electrostatic printing method, and an ink-jet printing method. Alternatively, because the surface protection layer 5 covers the entire surface on the front-surface side of the primary film layer 2, the surface protection layer 5 can be formed by various coating methods such as roll coating, knife coating, micro gravure coating, and dic coating. From these printing and coating methods, methods may be selected separately for the layers to be formed, or the same method may be selected for a collective process of the layers to be formed.

From the viewpoint of design quality, the pattern layer 3 and the surface protection layer 5 may be matched. For matching, the surface protection layer 5 needs to be collec-tively formed after the formation of the pattern layer 3 and therefore a gravure printing method is preferably used. In addition, the gravure printing method enables comparatively high-speed printing and therefore is advantageous and pref-erable also in terms of costs. Here, matching means that 50% or more, preferably 70% or more, most preferably 90% or more of the part in which the surface protection layer 5 is formed overlap the pattern part of the pattern layer 3 in plan view.

In order to adjust the layer thickness of the surface protection layer 5, the coating amount may be adjusted in the printing and coating methods described above. The coating amount can be obtained by producing a product including the surface protection layer formed on the base (primary film layer) by any of various printing and coating methods, and a product without the surface protection layer, and then calculating the difference in mass therebetween.

The surface protection layer 5 contains an ionizing radia-tion-curable resin as a main material. Here, the main mate-rial refers to a material contained in an amount of 60 parts by mass or more, more preferably 70 parts by mass or more, most preferably 80 parts by mass or more, relative to 100 parts by mass of the surface protection layer. As the ionizing radiation-curable resin forming the surface protection layer 5, known resins such as various monomers and commer-cially available oligomers can be used, and examples of known resins that can be used include (meth)acrylic resins, silicone-based resins, polyester-based resins, urethane-based resins, amide-based resins, and epoxy-based resins. The ionizing radiation-curable resin may be either an aqueous resin or a non-aqueous (organic solvent-based) resin.

The ionizing radiation-curable resin forming the surface protection layer 5 contains as a main component a trifunc-tional acrylate resin having a repeating structure. Examples of the trifunctional acrylate resin that can be used include trimethylolpropane triacrylate, glycerin triacrylate, isocya-nurate triacrylate, and pentaerythritol triacrylate.

Here, main component refers to it being contained in an amount of 60 parts by mass or more, more preferably 70 parts by mass or more, most preferably 80 parts by mass or more, relative to 100 parts by mass of the forming resin component. A difunctional acrylate resin is not preferred because the degree of crosslinking is insufficient and the scratch resistance is decreased. A tetra-or higher functional acrylate resin is not preferred because the degree of cross-linking becomes excessively high and the workability is decreased.

When a gravure printing method is used as a coating method, the suitable viscosity range of the ionizing radia-tion-curable resin is 10 to 500 mPa·s and the optimal viscosity range is 50 to 300 mPa·s. Therefore, it is preferred to use, as the trifunctional acrylate resin, trimethylolpropane triacrylate or glycerin triacrylate because the use of such a resin enables the achievement of the suitable viscosity range or the optimal viscosity range. A resin having a skeleton that causes hydrogen bonding or x-x stacking is not preferred because it has a high viscosity of 500 mPa·s or more in many cases. In order to adjust the viscosity, an organic solvent or a bifunctional acrylate resin having a low viscosity can be added. From the viewpoint of environmental burden, how-ever, it is preferred to use no organic solvent. A large addition amount of a bifunctional acrylate resin decreases the scratch resistance and therefore is not preferred. There-fore, when a bifunctional acrylate resin is used by adding it to the trifunctional acrylate resin, the content of the bifunctional acrylate resin is preferably in a range of 10 mass % or more and 30 mass % or less, more preferably in a range of 15 mass % or more and 20 mass % or less of the content (mass) of the trifunctional acrylate resin.

Trimethylolpropane triacrylate is easily obtained, and therefore preferred to glycerin triacrylate from the viewpoint of versatility.

The repeating structure is any of an ethylene oxide (EO) structure, a propylene oxide (PO) structure, or an ε-caprolactone (CL) structure. The repeating structure is more preferably ethylene oxide or propylene oxide. The ethylene oxide structure, the propylene oxide structure, and the ε-caprolactone structure are preferable because the molecules thereof are freely rotatable and highly flexible, and therefore easily undergo folding under light at 200 nm or less, and a fine irregular shape is easily formed. The number of repetitions of the repeating structure is 3 or more. The number of repetitions is more preferably 3 or more and 30 or less, most preferably 3 or more and 20 or less. When the number of repetitions is 2 or less, the ionizing radiation-curable resin forming the surface protection layer 5 does not sufficiently shrink during irradiation with vacuum ultraviolet light (VUV light) and the surface protection layer 5 does not have low gloss. When the number of repetitions is more than 30, crosslinking density is lowered and the scratch resistance of the surface protection layer 5 is deteriorated.

The number of repetitions of the repeating structure can be analyzed using MALDI-TOF-MS. The ionizing radiation-curable resin has a molecular weight distribution in some cases. When the ionizing radiation-curable resin has a molecular weight distribution, the number of repetitions refers to the number of repetitions of the structure corresponding to the molecular weight with the strongest peak in a MALDI-TOF-MS mass spectrum.

The ratio between vinyl groups and carbonyl groups contained in the ionizing radiation-curable resin (content ratio: content of vinyl groups/content of carbonyl groups) can be analyzed using Fourier transform infrared spectroscopy. The peak area at around $1,400 \text{ cm}^{-1}$ derived from vinyl groups and the peak area at around $1,720 \text{ cm}^{-1}$ derived from carbonyl groups are calculated, and the ratio (content ratio) vinyl groups/carbonyl groups can be calculated. Reactivity becomes higher, increasing crosslinking density, and the scratch resistance becomes higher, according as the ratio of vinyl groups is lower. Therefore, the ratio vinyl groups/carbonyl groups is preferably 20% or less. The ratio vinyl groups/carbonyl groups is more preferably 10% or less, further preferably 8% or less, most preferably 5% or less.

The ratio vinyl groups/carbonyl groups is preferably 0.01% or more. When the ratio vinyl groups/carbonyl groups is 0.01% or more, excellent scratch resistance can be imparted. In the ionizing radiation-curable resin, however, no vinyl group may be present.

Here, the ratio (content ratio) vinyl groups/carbonyl groups means a "mole ratio".

The ratio (content ratio) vinyl groups/carbonyl groups can be set to any value, for example, by adjusting the amount of ionizing radiation applied when the ionizing radiation-curable resin is cured.

The surface protection layer 5 may contain particles. The addition of an optimal amount of particles having an optimal particle size enables formation of a uniform surface. Examples of the particles that can be used include an organic material such as PE wax, PP wax, and resin beads, and an inorganic material such as silica, glass, alumina, titania, zirconia, calcium carbonate, and barium sulfate. The particles preferably have an average particle size (D50) of 10 μm or less. The particles have an average particle size of more preferably 1 μm or more and 8 μm or less, further preferably 2 μm or more and 6 μm or less, most preferably 3 μm or more and 5 μm or less. Particles having an average particle size of more than 10 μm are not preferred because they cause a decrease of the scratch resistance due to detachment of particles. Particles having an average particle size of less than 1 μm are not preferred because they have only a small effect of producing a uniform surface.

The addition amount of the particles is preferably 0.5 parts by mass or more and 10 parts by mass or less, relative to 100 parts by mass of the ionizing radiation-curable resin. The addition amount of the particles is more preferably 2 parts by mass or more and 8 parts by mass or less, further preferably 2 parts by mass or more and 6 parts by mass or less, most preferably 4 parts by mass or more and 5 parts by mass or less. The surface protection layer 5 containing the particles added thereto in the addition amount described above enables formation of a uniform-surface state and therefore is preferable.

Here, the "particle size (average particle size)" may be defined as a value (average value) obtained by particle size distribution measurement of the particles used or as a value obtained by actually measuring and averaging the particle sizes of a plurality of particles observed on a cross-section of the decorative material obtained. The two values of the particle size are obtained by different measuring methods, but are substantially the same. For example, the average particle size of the particles added to the surface protection layer 5 may be a median diameter (D50) measured by a laser diffraction/scattering particle size distribution analyzer.

When the entire surface protection layer 5 is cured by UV light, it is necessary to add a photoinitiator to the surface protection layer 5. The photoinitiator is not particularly limited, and examples thereof include benzophenone-based, acetophenone-based, benzoin ether-based, and thioxanthone-based photoinitiators.

In order to impart a required function to the surface protection layer 5, any functional additive, such as an antimicrobial agent and an antifungal agent, can be added. It is also possible to add an ultraviolet absorbent or a photostabilizer to the surface protection layer 5 as necessary. The ultraviolet absorbent is typically added in any combination between, for example, benzotriazole-based, benzoate-based, benzophenone-based, and triazine-based ultraviolet absorbents, and the photostabilizer is typically added in any combination between, for example, hindered amine-based photostabilizers.

This decorative sheet 1 thus formed has a gloss level of 15 or less regardless of containing no matting agent (matting additive). When a conventional decorative sheet including a surface protection layer has a gloss level of 8 or less, the content ratio of a matting agent in the surface protection layer is high and the surface protection layer becomes turbid. Therefore, there has been a possibility that the colors and the pattern of the colored pattern layer are not expressed clearly or the design quality of the decorative sheet is decreased. When a decorative sheet having a gloss level near 0 is attempted to be obtained, the content ratio of a matting agent in the surface protection layer is further increased. Therefore, it has been difficult to form a surface protection layer having a smooth surface without generating streaks, unevenness, or the like in forming the surface protection layer.

The decorative sheet 1 can provide a decorative sheet having a gloss level of 15 or less, while maintaining the same performance as the performance of a decorative sheet having a gloss level of 20 or more. Here, the "gloss level" is a measurement value obtained by measurement using a gloss meter in conformity with JIS Z 8741, with an incident angle of 60 degrees.

Concealing Layer 8

When concealment of the substrate B is desired to be imparted to the decorative sheet 1, such concealment can be achieved by using a colored sheet as the primary film layer 2 or separately disposing a concealing layer 8 that is opaque. The concealing layer 8 can be basically formed of the same material as the material of the pattern layer 3, but since the concealing layer 8 is provided for the purpose of concealment, preferably used as the pigment is, for example, an opaque pigment, titanium oxide, or iron oxide. In order to increase the concealment, it is also possible to add a metal such as gold, silver, copper, and aluminum. Typically, aluminum flakes are often added.

(Production Method)

A production example of a decorative sheet 1 will now be described.

A resin film is used as a primary film layer 2 and a surface protection layer 5 is formed on the top of the primary film layer 2 by printing. The surface of an applied ionizing radiation-curable resin in the surface protection layer 5 is irradiated with light having a wavelength of 200 nm or less (first irradiation light) and is shrunk. Subsequently, in order to cure the shrunk ionizing radiation-curable resin, irradiation is performed with ionizing radiation or with UV light having a wavelength greater than the first irradiation light of 200 nm or less. Thus, a decorative sheet 1 is formed that includes the surface protection layer 5 including a core portion 5A and a ridged portion 5B protruding in a ridged pattern from one surface (top) of the core portion 5A.

(Effects and Others)

The decorative sheet 1 according to the present embodiment includes the surface protection layer 5 having an irregular shape formed on the surface thereof. With this configuration, the gloss (gloss level) of the surface protection layer can be adjusted even when the surface protection layer contains no matting agent (matting additive). A matting agent decreases oil repellency of a layer formed of a resin material and therefore fingerprints are easily attached to the layer. The surface protection layer 5 of the present embodiment contains no matting agent and therefore does not absorb oil and relatively improves oil repellency. Therefore, in various situations during on-site construction, furniture assembly, and daily life of residents, fingerprints are less likely to adhere to the decorative sheet 1 including the surface protection layer 5.

Further, the configuration of the surface protection layer 5 having an irregular shape formed on the surface thereof improves oil repellency of the surface protection layer 5 and enables suppression of oil stains on the surface of the decorative sheet 1 and adsorption of contaminants thereto.

Furthermore, the configuration of the surface protection layer 5 containing no matting agent does not allow detachment of particles of a matting agent when the surface of the decorative sheet 1 is scratched, and the configuration enables a gloss change or scratches to be less likely to occur on the surface of the decorative sheet 1.

In the present embodiment, the surface protection layer 5 is formed of one layer, but is not limited to this configuration. For example, the surface protection layer 5 may have a multilayer configuration. That is, the surface protection layer 5 may include a plurality of laminated layers of an identical ionizing radiation-curable resin or a plurality of laminated layers of different ionizing radiation-curable resins, with the irregular shape formed on the surface of the surface protection layer 5. When the surface protection layer 5 includes a plurality of laminated layers of different ionizing radiation-curable resins, for example, the outermost layer of the surface protection layer 5 may contain an ionizing radiation-curable resin as a main material, the ionizing radiation-curable resin may contain as a main component a trifunctional acrylic resin having a repeating structure, the repeating structure may have any of an ethylene oxide, propylene oxide, or E-caprolactone structure, the number of repetitions of the repeating structure may be 3 or more, the content of vinyl groups contained in the ionizing radiation-curable resin may be 20% or less relative to the content of carbonyl groups contained in the ionizing radiation-curable resin, and a layer positioned on the primary-film-layer-2 side of the surface protection layer 5 (that is, a layer positioned below the outermost layer of the surface protection layer 5) is not particularly limited.

EXAMPLES

Hereinafter, examples based on the present invention are described.

Example 1

With use of a 55-μm-thick olefin film (manufactured by RIKEN TECHNOS CORP.) as a primary film layer, one surface of the primary film layer was subjected to a corona treatment and the following surface protection layer coating solution was applied to the one surface. The layer thickness of the surface protection layer coating solution was set to 5 μm. Thereafter, the surface of the surface protection layer coating solution was irradiated with light having a wavelength of 172 nm using a Xe excimer lamp such that the integrated light intensity of the light was 100 mJ/cm$^2$, and the surface was thus shrunk. Subsequently, the surface protection layer coating solution was cured by irradiation with 15 kGy of ionizing radiation to form a surface protection layer 5, and a decorative sheet of Example 1 having a total thickness of 60 μm was obtained.

(Surface Protection Layer Coating Solution)

The surface protection layer coating solution was formed by blending the following particles in the following ionizing radiation-curable resin.

Ionizing radiation-curable resin
  Type: trimethylolpropane EO-modified triacrylate (6 mol EO added)
  Product name: Miramer M3160 (manufactured by Miwon Specialty Chemical Co., Ltd.)
  Blended: 100 parts by mass
Particles
  Product name: SYLYSIA 250N (manufactured by Fuji Silysia Chemical Ltd.)
  Particle size: 5 μm
  Blended: 0.5 parts by mass

Example 2

A decorative sheet of Example 2 was obtained totally in the same manner as in Example 1 except for replacing the ionizing radiation-curable resin of Example 1 with the following.

Ionizing Radiation-Curable Resin

Type: trimethylolpropane EO-modified triacrylate (15 mol EO added)

Product name: SR9035 (manufactured by Sartomer)

Example 3

A decorative sheet of Example 3 was obtained totally in the same manner as in Example 1 except for replacing the ionizing radiation-curable resin of Example 1 with the following.

Ionizing Radiation-Curable Resin

Type: trimethylolpropane EO-modified triacrylate (3 mol EO added)

Product name: Miramer M3130 (manufactured by Miwon Specialty Chemical Co., Ltd.)

Example 4

A decorative sheet of Example 4 was obtained totally in the same manner as in Example 1 except for replacing the ionizing radiation-curable resin of Example 1 with the following.

Ionizing Radiation-Curable Resin

Type: Trimethylolpropane PO-modified triacrylate (6 mol PO added)

Product name: NK ESTER A-TMPT-6PO (manufactured by SHIN-NAKAMURA CHEMICAL Co., Ltd.)

Example 5

A decorative sheet of Example 5 was obtained totally in the same manner as in Example 1 except for replacing the ionizing radiation-curable resin of Example 1 with the following.

Ionizing Radiation-Curable Resin

Type: caprolactone-modified tris-(2-acryloxyethyl)isocyanurate (3 mol caprolactone (CL) added)

Product name: NK ESTER A-9300-3CL (manufactured by SHIN-NAKAMURA CHEMICAL Co., Ltd.)

Example 6

A decorative sheet of Example 6 having a total thickness of 56 μm was obtained totally in the same manner as in Example 1 except for changing the layer thickness of the surface protection layer coating solution of Example 1 to 1 μm.

Example 7

A decorative sheet of Example 7 having a total thickness of 57 μm was obtained totally in the same manner as in Example 1 except for changing the layer thickness of the surface protection layer coating solution of Example 1 to 2 μm.

Example 8

A decorative sheet of Example 8 having a total thickness of 75 μm was obtained totally in the same manner as in Example 1 except for changing the layer thickness of the surface protection layer coating solution of Example 1 to 20 μm.

Example 9

A decorative sheet of Example 9 having a total thickness of 80 μm was obtained totally in the same manner as in Example 1 except for changing the layer thickness of the surface protection layer coating solution of Example 1 to 25 μm.

Example 10

A decorative sheet of Example 10 was obtained totally in the same manner as in Example 8 except for replacing the ionizing radiation-curable resin of Example 8 with the following.

Ionizing Radiation-Curable Resin

Type: trimethylolpropane EO-modified triacrylate (30 mol EO added)

Example 11

A decorative sheet of Example 11 was obtained totally in the same manner as in Example 9 except for not adding the particles of Example 9.

Example 12

A decorative sheet of Example 12 was obtained totally in the same manner as in Example 3 except for not adding the particles of Example 3.

Example 13

A decorative sheet of Example 13 was obtained totally in the same manner as in Example 1 except for replacing the particles of Example 1 with the following.

Particles

Product name: SYLYSIA 450 (manufactured by Fuji Silysia Chemical Ltd.)

Particle size: 8.0 μm

Blended: 0.5 parts by mass

Example 14

A decorative sheet of Example 14 was obtained totally in the same manner as in Example 1 except for replacing the particles of Example 1 with the following.

Particles

Product name: SYLYSIA 780 (manufactured by Fuji Silysia Chemical Ltd.)

Particle size: 11.3 μm

Blended: 0.5 parts by mass

Example 15

A decorative sheet of Example 15 was obtained totally in the same manner as in

Example 1 except for changing the blending amount of the particles of Example 1 to 10 parts by mass.

Example 16

A decorative sheet of Example 16 was obtained totally in the same manner as in Example 1 except for changing the blending amount of the particles of Example 1 to 11 parts by mass.

Example 17

A decorative sheet of Example 17 having a total thickness of 56 μm was obtained totally in the same manner as in Example 1 except for changing the layer thickness of the surface protection layer coating solution of Example 1 to 1 μm and blending no particles.

Example 18

A decorative sheet of Example 18 was obtained totally in the same manner as in Example 8 except for replacing the ionizing radiation-curable resin of Example 8 with the following.
Ionizing Radiation-Curable Resin Type: trimethylolpropane EO-modified triacrylate (50 mol EO added)

Example 19

A decorative sheet of Example 19 having a total thickness of 56 μm was obtained totally in the same manner as in Example 3 except for changing the layer thickness of the surface protection layer coating solution of Example 3 to 1 μm.

Example 20

A decorative sheet of Example 20 was obtained totally in the same manner as in Example 1 except for changing the amount of ionizing radiation of Example 1 to 30 kGy.

Example 21

A decorative sheet of Example 21 was obtained totally in the same manner as in Example 1 except for changing the amount of ionizing radiation of Example 1 to 60 kGy.

Example 22

A decorative sheet of Example 22 was obtained totally in the same manner as in Example 1 except for changing the amount of ionizing radiation of Example 2 to 30 kGy.

Example 23

A decorative sheet of Example 23 was obtained totally in the same manner as in Example 1 except for changing the amount of ionizing radiation of Example 2 to 60 kGy.

Example 24

A decorative sheet of Example 24 was obtained totally in the same manner as in Example 1 except for changing the amount of ionizing radiation of Example 3 to 30 kGy.

Example 25

A decorative sheet of Example 25 was obtained totally in the same manner as in Example 1 except for changing the amount of ionizing radiation of Example 3 to 60 kGy.

Comparative Example 1

A decorative sheet of Comparative Example 1 was obtained totally in the same manner as in Example 1 except for not performing the irradiation using an excimer lamp of Example 1 and changing the blending amount of the particles to 15 parts by mass.

Comparative Example 2

A decorative sheet of Comparative Example 2 was obtained totally in the same manner as in Example 1 except for replacing the ionizing radiation-curable resin of Example 1 with the following.

Ionizing Radiation-Curable Resin

Type: ethylene glycol diacrylate (9 mol EO added)

Product name: Light Acrylate 9EG-A (Kyoeisha Chemical Co., Ltd.)

Comparative Example 3

A decorative sheet of Comparative Example 3 was obtained totally in the same manner as in Example 1 except for replacing the ionizing radiation-curable resin of Example 1 with the following.
Ionizing Radiation-Curable Resin Type: pentaerythritol tetraacrylate (35 mol EO added)

Product name: NK ESTER ATM-35E (manufactured by SHIN-NAKAMURA CHEMICAL Co., Ltd.)

Comparative Example 4

A decorative sheet of Comparative Example 4 was obtained totally in the same manner as in Example 1 except for replacing the ionizing radiation-curable resin of Example 1 with the following.
Ionizing Radiation-Curable Resin Type: trimethylolpropane triacrylate Product name: NK ESTER A-TMPT (manufactured by SHIN-NAKAMURA CHEMICAL Co., Ltd.)

Comparative Example 5

A decorative sheet of Comparative Example 5 was obtained totally in the same manner as in Example 1 except for changing the amount of ionizing radiation of Example 1 to 5 kGy.
(Evaluations)

The decorative sheets of Examples 1 to 25 and Comparative Examples 1 to 5 obtained by the methods described above were evaluated.

When evaluated as "good" or "fair" in the present examples, the decorative sheet had no problem in actual use and was therefore evaluated as approved.

Surface State

As the surface state, the uniformity of the surface was evaluated by visual inspection.

The evaluation criteria were as follows.

Good: uniform surface

Fair: partially nonuniform

Poor: entire surface nonuniform

Gloss Level

As the gloss level, a 60-degree gloss level was measured using Rhopoint IQ (manufactured by KONICA MINOLTA, INC.). Tables 1 to 4 show the 60-degree gloss level as "60° gloss value".

When having a gloss level of 15 or less, the surface is sufficiently visually recognized as low gloss. Therefore, surfaces having a gloss level of 15 or less were evaluated as approved in the present examples.

Fourier Transform Infrared Spectroscopy

For Fourier transform infrared spectroscopy, Frontier (manufactured by PerkinElmer Inc.) with a single-reflection (incident angle 45°) ATR unit with a diamond crystal having a sample contact area of 2 mmφ was used. The measurement conditions included a measurement wavenumber ranging from 4,000 cm$^{-1}$ to 400 cm$^{-1}$ and a resolution of 2.0 cm$^{-1}$, the interior of the optical system was replaced with a nitrogen atmosphere, and an absorption spectrum was obtained with an accumulation of 16 scans. The obtained spectrum was subjected to ATR correction, and the value of a peak area ratio x was calculated using Equation 1 below.

$$\text{Peak area ratio } x = (\text{peak area at around } 1,400 \text{ cm}^{+1})/(\text{peak area at around } 1,725 \text{ cm}^{-1}) \quad \text{(Equation 1)}$$

Here, in Equation 1, the peak at around 1,400 cm$^{-1}$ refers to a peak having a maximum absorbance at 1,400±10 cm$^{-1}$, and the peak at around 1,725 cm$^{-1}$ refers to a peak having a maximum absorbance at 1,725±10 cm$^{-1}$.

In the present examples and comparative examples, the ratio "vinyl groups/carbonyl groups (%)" was calculated from the value of the peak area ratio x.

Further, by adjusting the amount of ionizing radiation, the ratio "vinyl groups/carbonyl groups (%)" was adjusted in the present examples and comparative examples.

Fingerprint Resistance: Evaluation of Wipe-Off Properties

As an evaluation of fingerprint resistance, an evaluation of fingerprint wipe-off properties was conducted.

The 60-degree gloss level of the surface of the decorative sheets was measured and defined as an [initial gloss level]. Subsequently, a fingerprint-resistance evaluation solution was adhered onto the surface protection layer and then the fingerprint-resistance evaluation solution adhered to the surface of the decorative sheet was wiped off. Thereafter, the 60-degree gloss level of the part from which the fingerprint-resistance evaluation solution had been wiped off was measured and defined as a [post-wipe-off gloss level]. Here, as the fingerprint-resistance evaluation solution, a higher fatty acid was used.

The fingerprint wipe-off rate was calculated as follows.

$$\text{Fingerprint wipe-off rate (\%)} = (\text{post-wipe-off gloss level}/\text{initial gloss level}) \times 100$$

The evaluation criteria were as follows.
Good: 70% or more and less than 250%
Fair: 50% or more and less than 70%, or 250% or more and less than 300%
Poor: less than 50% or 300% or more Stain Resistance As an evaluation of stain resistance, the stain resistance against ink was evaluated by a stain A test stipulated in Japanese Agricultural Standards (JAS), in which 10-mm-wide lines were drawn respectively in blue ink, quick-drying black ink, and red crayon and left for 4 hours, and then the blue ink, quick-drying black ink, and red crayon lines were wiped off with cloth impregnated with ethanol.

The evaluation criteria were as follows.
Good: all the color lines could be easily wiped off.
Fair: part of the color lines could be wiped off but stains were partially left.
Poor: the color lines could not be wiped off.

Scratch Resistance Test: Stainless Steel Wool Rubbing Test

The decorative sheets obtained were each bonded to a wooden substrate B using a urethane-based adhesive, and then subjected to a stainless steel wool rubbing test as a scratch resistance evaluation. The decorative sheet was rubbed for 20 strokes with steel wool having a load of 100 g or 200 g placed thereon and checked by visual inspection for scratches and change of gloss occurred on the surface of the decorative sheet.

The evaluation criteria were as follows.
Good: neither scratches nor change of gloss occurred on the surface
Fair: slight scratches and/or change of gloss occurred on the surface
Poor: severe scratches and/or change of gloss occurred on the surface Scratch Resistance Test: Hoffman Scratch Test The decorative sheets obtained were each bonded to a wooden substrate B using a urethane-based adhesive, and then subjected to a Hoffman scratch test as a scratch resistance evaluation, using a Hoffman scratch hardness tester (BYK-Gardner GmbH).

The evaluation criteria were as follows.
Very good: no scratch occurred with load of 300 g
Good: no scratch occurred with load of 250 g or more and less than 300 g
Fair: no scratch occurred with load of 200 g or more and less than 250 g
Poor: scratches occurred with load of less than 200 g When evaluated as "very good", "good" or "fair" in the present examples, the decorative sheet had no problem in use and was evaluated as approved.

Bending Workability Test

The decorative sheets obtained were each bonded to a wooden substrate B using a urethane-based adhesive, with the primary film layer-side surface (that is, the rear surface of the decorative sheet) directed to the wooden substrate B side, and then a V-shaped groove was made to the bonding boundary between the wooden substrate B and the decorative sheet 1 in such a manner as not to damage the decorative sheet.

Next, the wooden substrate B was bent to 90 degrees along the V-shaped groove so that the convex side of the fold was on the surface protection layer-side of the decorative sheet (that is, the front surface of the decorative sheet). The bent part of the front surface of the decorative sheet was observed with an optical microscope to determine whether whitening or cracking occurred, and the state of bending workability was evaluated.

The evaluation criteria were as follows.
Good: neither whitening nor cracking observed
Fair: whitening observed in some parts
Poor: whitening observed in entire surface or cracking observed in some parts The evaluation results are shown in Tables 1 to 4.

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
|  | Surface shape | Ridged | Ridged | Ridged | Ridged | Ridged | Ridged | Ridged | Ridged | Ridged | Ridged |
|  | RSm/Ra | 120 | 100 | 200 | 120 | 120 | 300 | 200 | 80 | 50 | 10 |
|  | Thickness (μm) | 5 | 5 | 5 | 5 | 5 | 1 | 2 | 20 | 25 | 20 |
| Acrylic resin | Number of functional groups | 3 | 3 | 3 | 3 | 3 | 3 | 3 | 3 | 3 | 3 |
|  | Repeating structure — Structure | $C_2H_4O$ | $C_2H_4O$ | $C_2H_4O$ | $C_3H_6O$ | $C_6H_{10}O_2$ | $C_2H_4O$ | $C_2H_4O$ | $C_2H_4O$ | $C_2H_4O$ | $C_2H_4O$ |
|  | Repeating structure — Number of repetitions | 6 | 15 | 3 | 6 | 3 | 6 | 6 | 6 | 6 | 30 |
|  | Vinyl groups/carbonyl groups (%) | 20% | 20% | 20% | 20% | 20% | 20% | 20% | 20% | 20% | 20% |
| Additive | Particle size (μm) | 5 | 5 | 5 | 5 | 5 | 5 | 5 | 5 | 5 | 5 |
|  | Addition amount (part) | 0.5 | 0.5 | 0.5 | 0.5 | 0.5 | 0.5 | 0.5 | 0.5 | 0.5 | 0.5 |
|  | Surface state | Good | Good | Good | Good | Good | Fair | Good | Good | Good | Good |
|  | 60° Gloss value | 3 | 2 | 5 | 3 | 10 | 8 | 5 | 2 | 1.5 | 0.8 |
|  | Fingerprint resistance | Good | Good | Good | Good | Good | Good | Good | Good | Good | Good |
| Stain resistance | Stain A | Good | Good | Good | Good | Good | Good | Good | Good | Good | Good |
| Scratch resistance | Steel 100 g | Good | Good | Good | Good | Good | Fair | Good | Good | Good | Good |
|  | Steel 200 g | Good | Good | Good | Good | Good | Fair | Good | Good | Good | Good |
|  | Hoffman scratch | Fair | Fair | Good | Fair | Good | Fair | Fair | Fair | Fair | Fair |
| Workability | V cut | Good | Good | Good | Good | Good | Good | Good | Good | Fair | Fair |

TABLE 2

|  |  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
|  | Surface shape | Ridged | Ridged | Ridged | Ridged | Ridged | Ridged | Ridged | Ridged | Ridged | Ridged |
|  | RSm/Ra | 50 | 250 | 120 | 120 | 140 | 120 | 300 | 8 | 350 | 120 |
|  | Thickness (μm) | 25 | 5 | 5 | 5 | 5 | 5 | 1 | 20 | 1 | 5 |
| Acrylic resin | Number of functional groups | 3 | 3 | 3 | 3 | 3 | 3 | 3 | 3 | 3 | 3 |
|  | Repeating structure — Structure | $C_2H_4O$ | $C_2H_4O$ | $C_2H_4O$ | $C_2H_4O$ | $C_2H_4O$ | $C_2H_4O$ | $C_2H_4O$ | $C_2H_4O$ | $C_2H_4O$ | $C_2H_4O$ |
|  | Repeating structure — Number of repetitions | 6 | 3 | 6 | 6 | 6 | 6 | 6 | 50 | 3 | 6 |
|  | Vinyl groups/carbonyl groups (%) | 20% | 20% | 20% | 20% | 20% | 20% | 20% | 20% | 20% | 10% |
| Additive | Particle size (μm) | None | None | 8 | 11 | 5 | 5 | None | 5 | 5 | 5 |
|  | Addition amount (part) | — | — | 0.5 | 0.5 | 10 | 11 | — | 0.5 | 0.5 | 0.5 |
|  | Surface state | Fair | Fair | Good | Good | Good | Good | Fair | Good | Fair | Good |
|  | 60° Gloss value | 3 | 7 | 3 | 3 | 3 | 3 | 10 | 0.8 | 15 | 3 |
|  | Fingerprint resistance | Good | Good | Good | Fair | Good | Fair | Good | Good | Good | Good |
| Stain resistance | Stain A | Good | Good | Good | Fair | Good | Fair | Good | Fair | Good | Good |
| Scratch resistance | Steel 100 g | Good | Good | Good | Fair | Good | Fair | Fair | Fair | Fair | Good |
|  | Steel 200 g | Good | Good | Good | Fair | Good | Fair | Fair | Fair | Fair | Good |
|  | Hoffman scratch | Fair | Good | Fair | Fair | Fair | Fair | Fair | Fair | Fair | Very good |
| Workability | V cut | Fair | Good | Good | Fair | Good | Fair | Good | Fair | Good | Good |

TABLE 3

|  |  | Ex. 21 | Ex. 22 | Ex. 23 | Ex. 24 | Ex. 25 |
|---|---|---|---|---|---|---|
|  | Surface shape | Ridged | Ridged | Ridged | Ridged | Ridged |
|  | RSm/Ra | 120 | 100 | 100 | 200 | 200 |
|  | Thickness (μm) | 5 | 5 | 5 | 5 | 5 |
| Acrylic resin | Number of functional groups | 3 | 3 | 3 | 3 | 3 |
|  | Repeating structure — Structure | $C_2H_4O$ | $C_2H_4O$ | $C_2H_4O$ | $C_2H_4O$ | $C_2H_4O$ |
|  | Repeating structure — Number of repetitions | 6 | 15 | 15 | 3 | 3 |
|  | Vinyl groups/carbonyl groups (%) | 5% | 10% | 5% | 10% | 5% |

TABLE 3-continued

|  |  | Ex. 21 | Ex. 22 | Ex. 23 | Ex. 24 | Ex. 25 |
|---|---|---|---|---|---|---|
| Additive | Particle size (μm) | 5 | 5 | 5 | 5 | 5 |
|  | Addition amount (part) | 0.5 | 0.5 | 0.5 | 0.5 | 0.5 |
|  | Surface state | Good | Good | Good | Good | Good |
|  | 60° Gloss value | 3 | 2 | 2 | 5 | 5 |
| Fingerprint resistance |  | Good | Good | Good | Good | Good |
| Stain resistance | Stain A | Good | Good | Good | Good | Good |
| Scratch resistance | Steel 100 g | Good | Good | Good | Good | Good |
|  | Steel 200 g | Good | Good | Good | Good | Good |
|  | Hoffman scratch | Very good | Very good | Very good | Very good | Very good |
| Workability | V cut | Good | Good | Good | Good | Good |

TABLE 4

|  |  | Comp. Ex. 1 | Comp. Ex. 2 | Comp. Ex. 3 | Comp. Ex. 4 | Comp. Ex 5 |
|---|---|---|---|---|---|---|
|  | Surface shape | Irregularities due to particles | Ridged | Ridged | Ridged | Ridged |
|  | RSm/Ra | 400 | 100 | 300 | 4,000 | 120 |
|  | Thickness (μm) | 5 | 5 | 5 | 5 | 5 |
| Acrylic resin | Number of functional groups | 3 | 2 | 4 | 3 | 3 |
|  | Repeating structure   Structure | C2H4O | C2H4O | C2H4O | None | C2H4O |
|  | Number of repetitions | 6 | 9 | 35 | 0 | 6 |
|  | Vinyl groups/carbonyl groups (%) | 20% | 20% | 20% | 20% | 30% |
| Additive | Particle size (μm) | 5 | 5 | 5 | 5 | 5 |
|  | Addition amount (part) | 15 | 0.5 | 0.5 | 0.5 | 0.5 |
|  | Surface state | Good | Good | Good | Good | Good |
|  | 60° Gloss value | 10 | 3 | 5 | 90 | 3 |
| Fingerprint resistance |  | Poor | Good | Good | Poor | Fair |
| Stain resistance | Stain A | Poor | Good | Good | Good | Fair |
| Scratch resistance | Steel 100 g | Poor | Poor | Good | Good | Fair |
|  | Steel 200 g | Poor | Poor | Good | Good | Poor |
|  | Hoffman scratch | Poor | Poor | Fair | Fair | Poor |
| Workability | V cut | Good | Good | Poor | Good | Fair |

As shown in Tables 1 to 3, the decorative sheets of Examples 1 to 25 can provide decorative sheets achieving all of fingerprint resistance, scratch resistance, stain resistance, and bending workability while even having a gloss of 15 or less. By optimizing not only the surface shape of the surface protection layer and the resin composition of the surface protection layer, but also the layer thickness of the surface protection layer and the particle size and the addition amount of particles blended therein, the performance can be further improved.

[Reference Signs List] 1 . . . Decorative sheet; 2 . . . Primary film layer; 3 . . . Pattern layer; 4 . . . Transparent resin layer; 5 . . . Surface protection layer; 6 . . . Primer layer; 7 . . . Adhesive layer; 8 . . . Concealing layer; 11 . . . Decorative material; B . . . Substrate.

What is claimed is:

1. A decorative sheet comprising:
a primary film layer; and a surface protection layer disposed on one surface of the primary film layer, wherein
the surface protection layer has a gloss level of 15 or less,
the surface protection layer includes on a surface thereof a ridged portion protruding in a ridged pattern and thus has an irregular shape formed on the surface, the surface protection layer contains an ionizing radiation-curable resin as a main material,
the ionizing radiation-curable resin contains as a main component a trifunctional acrylic resin having a repeating structure,
the repeating structure is any of an ethylene oxide, propylene oxide, or ε-caprolactone structure,
the number of repetitions of the repeating structure is 3 or more, and
vinyl groups contained in the ionizing radiation-curable resin are 20% or less relative to carbonyl groups contained in the ionizing radiation-curable resin.

2. The decorative sheet of claim 1, wherein
the irregular shape of the surface protection layer has a ratio RSm/Ra in a range of 10 or more and 300 or less.

3. The decorative sheet of claim 1, wherein
the irregular shape of the surface protection layer has a ratio RSm/Ra in a range of 50 or more and 300 or less.

4. The decorative sheet of claim 1, wherein
the irregular shape of the surface protection layer has a ratio RSm/Ra in a range of 100 or more and 300 or less.

5. The decorative sheet of claim 1, wherein
the surface protection layer has a thickness in a range of 2 μm or more and 20 μm or less.

6. The decorative sheet of claim 1, wherein
the surface protection layer includes particles having an
average particle size of 10 μm or less.

7. The decorative sheet of claim 6, wherein
an addition amount of the particles is in a range of 0.5
parts by mass or more and 10 parts by mass or less,
relative to 100 parts by mass of the ionizing radiation-
curable resin.

8. A method for producing the decorative sheet of claim
1, the method comprising the steps of:
irradiating a surface of an applied ionizing radiation-
curable resin with light having a wavelength of 200 nm
or less and then irradiating the surface with ionizing
radiation or with UV light having a wavelength greater
than the light having a wavelength of 200 nm or less to
form the surface protection layer including a ridged
portion protruding in a ridged pattern.

9. The method of claim 8, wherein
the light having a wavelength of 200 nm or less is light
having a wavelength of 172 nm.

* * * * *